(12) United States Patent
Haberer (10) Patent No.: US 9,423,244 B2
(45) Date of Patent: Aug. 23, 2016

(54) SYSTEM AND METHOD FOR CONFIGURING A MONITORED ZONE OF AN OPTOELECTRONIC MONITORING DEVICE

(71) Applicant: SICK AG, Waldkirch/Breisgau (DE)

(72) Inventor: Manfred Haberer, Riegel (DE)

(73) Assignee: SICK AG, Waldkirch/Breisgau (DE)

( * ) Notice: Subject to any disclaimer, the term of this patent is extended or adjusted under 35 U.S.C. 154(b) by 99 days.

(21) Appl. No.: 14/246,542

(22) Filed: Apr. 7, 2014

(65) Prior Publication Data

US 2014/0300905 A1    Oct. 9, 2014

(30) Foreign Application Priority Data

Apr. 8, 2013  (EP) .................................... 13162699

(51) Int. Cl.
*G01B 11/24* (2006.01)
*G01V 8/12* (2006.01)

(52) U.S. Cl.
CPC . *G01B 11/24* (2013.01); *G01V 8/12* (2013.01)

(58) Field of Classification Search
CPC .... G01B 11/24; G08B 25/008; G08B 19/005; G08B 27/003; H04L 67/12; H04L 12/2885
USPC .......................... 250/221, 239, 214.1, 214 R; 340/555–557; 359/601–608
See application file for complete search history.

(56) References Cited

U.S. PATENT DOCUMENTS

| | | | |
|---|---|---|---|
| 5,903,355 A * | 5/1999 | Schwarz | G07C 9/00 250/221 |
| 8,970,349 B2 * | 3/2015 | Gutierrez | G08B 13/19682 340/506 |
| 2009/0015663 A1 | 1/2009 | Doettling et al. | |

FOREIGN PATENT DOCUMENTS

| DE | 19964492 B4 | 10/2012 |
|---|---|---|
| DE | 202011051975 U1 | 4/2013 |
| EP | 2048557 A1 | 4/2009 |
| EP | 2053538 A1 | 4/2009 |

OTHER PUBLICATIONS

European Search Report dated Sep. 19, 2013 ; Relating to European Patent Application 13/162,699.9 ; English Translation Attached.

* cited by examiner

*Primary Examiner* — Que T Le
(74) *Attorney, Agent, or Firm* — Nath, Goldberg & Meyer; Jerald L. Meyer; Christopher Thomas (57) ABSTRACT

A system for configuring a monitored zone of an optoelectronic monitoring device has an optical reception device for detecting an optical sequence generated by a sequence generation unit. A first memory device is used to store an association between the optical sequences selectable at the sequence generation unit and shape elements. A second memory device stores a shape of the monitored zone, and an evaluation unit determines the shape of the monitored zone from the detected optical sequences and the shape elements.

15 Claims, 7 Drawing Sheets

SYSTEM AND METHOD FOR CONFIGURING A MONITORED ZONE OF AN OPTOELECTRONIC MONITORING DEVICE

BACKGROUND

Technical Field

The invention relates to a system for configuring a monitored zone of an optoelectronic monitoring system and to a corresponding method.

Optoelectronic monitoring devices are used, for example, to monitor monitored zones. It is, for example, frequently necessary in safety applications to ensure that no unauthorized objects are present in such a monitored zone. It is thus e.g. necessary to ensure with a hazardous machine, e.g. with a press, that no body part of an operator is located in a defined protected zone during operation and would thus be in danger.

Provision is made in other applications, for example, that the zone in front of a moving vehicle, e.g. of a driverless transport system, is monitored so that no collisions can occur.

In particular scanners, preferably laser scanners, are used as optoelectronic monitoring devices. With such devices, a laser beam is transmitted into the monitored zone and is e.g. periodically deflected by a rotating mirror so that the laser beam scans the monitored zone. If an object is located in the scan zone of the laser, the light transmitted by the laser is reflected or remitted and arrives back at the laser scanner and is detected by a receiver there. The presence of an object in the monitored zone can therefore be determined using a corresponding evaluation unit. If the laser radiation is pulsed or modulated, the time of flight of a transmitted and possibly reflected light pulse can thus be evaluated to obtain information via the light speed on the distance of the reflective or remitting object.

So that an optoelectronic apparatus, e.g. a laser scanner, can safely carry out an operation and the correct zone is monitored as the monitored zone, the optoelectronic monitoring device has to be configured before its operation. The monitored zone to be monitored in particular has to be determined or set.

Known solutions provide for this purpose that the protected field geometry is parameterized at a graphical user interface with the aid of a personal computer during the putting into operation of the laser scanner and is transmitted into the optoelectronic monitoring apparatus via a communication interface. This process can only be carried out by trained users with corresponding knowledge of, inter alia, the user interface for reasons of safety.

Other known solutions provide that the monitored zone has to be input directly at the monitoring device with the aid of keys and a display. Such a process is only possible for very simple monitored zone geometries due to the complex configuration since a corresponding user interface is dispensed with.

SUMMARY OF INVENTION

It is the object of the present invention to provide a system and a method for configuring a monitored zone of an optoelectronic monitoring device with the aid of which system and/or method it is possible to configure the monitored zone fast and intuitively.

This object is satisfied by a system having the features of claim 1 and by a method having the features of claim 18. Claim 17 is directed to a sequence generation unit for use in a system in accordance with the invention. Dependent claims are directed to advantageous embodiments.

The system in accordance with the invention has a sequence generation unit for generating time-variable, distinguishable optical sequences. An optical sequence can be selected using a selection device and the generation of the selected optical sequence can be triggered with the aid of a triggering device. An optoelectronic monitoring device of the system in accordance with the invention which is provided for the spatially resolved monitoring of a monitored zone to be configured in particular has an optical reception device with whose aid the optical sequence generated by the sequence generation unit can be detected. This optical reception device can advantageously be the optical reception device anyway present in the optoelectronic monitoring device for the spatially resolved monitoring of the monitored zone.

The optoelectronic monitoring device of the system in accordance with the invention furthermore has a first memory device in which an association is stored between the optical sequences selectable at the sequence generation unit, on the one hand, and has form elements which can serve for the characterization of the shape of a monitored zone to be configured. This association allows an unambiguous association of a shape element with a corresponding optical sequence. The shape element "corner of the monitored zone", etc., can be associated with a specific optical sequence, for example. The optoelectronic monitoring device of the system in accordance with the invention additionally has a second memory device in which the shape of a monitored zone can be stored after it has been configured using the system in accordance with the invention. The first and the second memory devices can generally also be formed by the same memory device.

Finally, the monitoring device of the system in accordance with the invention has an evaluation unit which determines the shape of a monitored zone from (i) the detected optical sequences which are generated by the sequence generation unit and (ii) the shape elements stored in the first memory device and associated with these optical sequences and stores said shape in the second memory device.

The triggering device and the selection device can e.g. be formed by a number of buttons or switches at the sequence generation unit which are associated with different optical sequences. Provision can naturally also be made that the generation of the selected optical sequence can also immediately be triggered by actuating the selection device so that the selection and triggering device for the respective optical sequence is formed by one element.

Provision can alternatively be made that the selection takes place via an e.g. radio-based remote control.

The shape elements stored in the first memory device can e.g. be the starting points and the end points of a predefined line, e.g. a line of a part circle, with which a monitored zone can be unambiguously identified. For instance, by e.g. fixing the starting point and the end point of a line of a part circle, the semicircular environmental zone of a laser scanner to be scanned by a laser can be defined as the monitored zone.

It is equally possible that such a shape element is set by the radius of a circle or of a part circle because an unambiguous determination of a monitored zone is also possible in this manner.

Another preferred aspect provides that the shape elements are formed by the corner points of a polygonal chain so that it is possible to define polygonal, that is e.g. rectangular, monitored zones in that the corner points of the polygon are used as shape elements.

A configuration method in accordance with the invention which can be carried out using a system in accordance with the invention serves for the determination of a monitored zone. A sequence generation unit of a system in accordance with the invention is for this purpose positioned at a selected location of a monitored zone to be defined, that is e.g. at the corner of a polygonal chain or at the radius of a circle. That optical sequence is then selected using the selection device of the sequence generation unit which corresponds to the shape element which characterizes the shape of the monitored zone to be defined at the selected location. If therefore the sequence generation unit is e.g. located just at the corner of a polygonal chain, a corresponding optical sequence is selected at the selection device which is unambiguously associated with the shape element "corner of the polygonal chain". The selected optical sequence is either thereupon generated or is already generated by the selection by the sequence generation unit.

The monitoring device of the system detects the generated optical sequence at the selected location and can accordingly associate a shape element with this selected location with the aid of the specific optical sequence for the corresponding shape element in that it polls the associated stored in the first memory device.

The named steps are repeated so often as required by the shape of the monitored zone to be defined or to be determined. It is thus e.g. conceivable that the described steps are carried out at each corner of a corresponding polygonal chain for the definition of the polygonal monitored zone. On the other hand, it may be sufficient, e.g. in the fixing of a circular monitored zone, if the radius is correspondingly set at one position.

Finally, the shape of the monitored zone characterized in this manner by the monitoring device of the system from the determined shape elements is stored.

It is therefore possible in a very simple and intuitive manner using the system in accordance with the invention or the method in accordance with the invention to define or to fix the monitored zone of an optoelectronic monitoring device and to configure the monitoring device accordingly. This is possible without any special knowledge or use of special configuration software. No additional hardware except for the sequence generation unit is therefore required. Since the sequence generation unit is positioned physically directly at the boundary of the monitored zone to be determined, errors in the dimensioning are more unlikely than e.g. in the fixing of a monitored zone at the screen of a user interface.

The system in accordance with the invention and the method in accordance with the invention can be used for different optoelectronic monitoring devices to configure the monitored zone. The system in accordance with the invention and the method in accordance with the invention can, however, be used particularly advantageously in scanner systems, in particular laser scanners, because the corresponding reception devices are already present here. In such a laser scanner, a laser beam is periodically scanned over the monitored zone and if an object is present in the direction of the monitoring device, the laser beam is reflected by it.

It is generally also possible to configure three-dimensional monitored zones if the sequence generation unit can be positioned in such a manner at different points of a space, e.g. on correspondingly configured stands, in order also to be able to fix the vertical direction of the monitored zone.

The system in accordance with the invention can have a sequence generation unit which itself generates a corresponding optical sequence depending on the selection of the optical sequence and outputs it at a corresponding light source. For example, the different light signals which are associated with the different shape elements can be formed by modulated light signals with a different modulation frequency or by light signals of a different light frequency. The optical reception device of the monitoring device of such a configuration of the system in accordance with the invention can then draw a conclusion on the selected shape element from the frequency of the received light signal or from the modulation frequency of the received light signal.

A particularly advantageous embodiment of the system in accordance with the invention, however, has a sequence generation unit in which a change in the remission of the surface can be caused at least in one region of said surface. Such a remission change can e.g. be effected with the aid of an electromagnetic diaphragm or a liquid crystal diaphragm for a time-variable shading of an otherwise reflective surface of the sequence generation unit. It is possible with the aid of such a diaphragm to generate a corresponding time-variable signal—e.g. with a specifically selected frequency—in dependence on the selected shape element in order to be able to detect such a frequency-dependent optical sequence in the monitoring device to be able to determine the selected shape element.

A corresponding actuation of the diaphragm of a corresponding embodiment of the sequencing unit in the time sequence associated with the shape element makes it possible for the monitoring device to identify the corresponding shape element.

Alternatively, it is e.g. possible to provide a diaphragm device which can rotate about the sequence generation unit which is then preferably configured as cylindrical. If the diaphragm has one or more apertures, they move past the reflective surface and in this manner generate a time-varied optical sequence when the sequence generation unit is illuminated by light e.g. of the monitoring device.

In a similar manner, a movable, in particular rotatable, carrier device can be provided at the sequence generation unit which carries one or more reflective part regions and is used for remission variation.

In the described embodiments, in which the optical sequence is generated with the aid of the remission of the sequence generation unit, the sequence generation unit therefore acts passively. Light of the monitoring device, e.g. the laser beam transmitted by a laser scanner, is incident onto the sequence generation unit. Depending on the time-variable remission of the sequence generation unit, the laser beam is reflected back at a different intensity in a correspondingly time-dependent manner and is detected by the optical reception device of the monitoring device. The optical sequence which is generated in a time-variable manner at the sequence generation unit can thus be detected by the monitoring device and can be used for determining or fixing the shape of the monitored zone. A transmission device and a corresponding reception device are in this respect provided in a manner known per se.

Particularly advantageously, a respective coding sequence with respect to the corresponding shape elements is stored as an optical sequence in the first memory device and can be recognized by the optical reception device of the monitoring device.

The invention is additionally directed to a sequence generation unit for a system in accordance with the invention. The sequence generation unit in accordance with the invention has a selection device for selecting the optical sequence and has a triggering device for triggering the generation of the selected optical sequence.

Advantageous embodiments and advantages of the sequence generation unit in accordance with the invention result from the above-described special configurations of the system in accordance with the invention and from its advantages.

The sequence generation unit in accordance with the invention can in particular have a unit for the time variation of the remission of the surface or can have a continuous light source which can be controlled via corresponding diaphragms as has been described above.

The invention additionally relates, as described, to a configuration method in accordance with the invention for fixing a monitored zone, in particular the monitored zone of a scanner having the features of claim 18. The advantages of the configuration method in accordance with the invention result from the above-described advantages of the system in accordance with the invention. Advantageous embodiments of the configuration method in accordance with the invention result in an analog manner from the above description of the special embodiments of the system in accordance with the invention.

The monitored zone of an optoelectronic monitoring device can either (i) be set again—in that the sequence generation unit is positioned at the corresponding points of a monitored zone to be set—or (ii) the monitored zone of an optoelectronic monitoring device can be determined and communicated to the evaluation unit, for example—in that the sequence generation unit is positioned at the characteristic points of the existing monitored zone—using the system in accordance with the invention or the method in accordance with the invention. Both method procedures are covered by the invention and should be understood under the term "configuration" or "determination".

Further embodiments and aspects in accordance with the invention result from the dependent claims, from the Figures and from the description.

BRIEF DESCRIPTION OF THE DRAWINGS

The invention will be described with reference to embodiments in accordance with the invention which are shown in the enclosed schematic Figures. There are shown.

DETAILED DESCRIPTION

Figure 1:
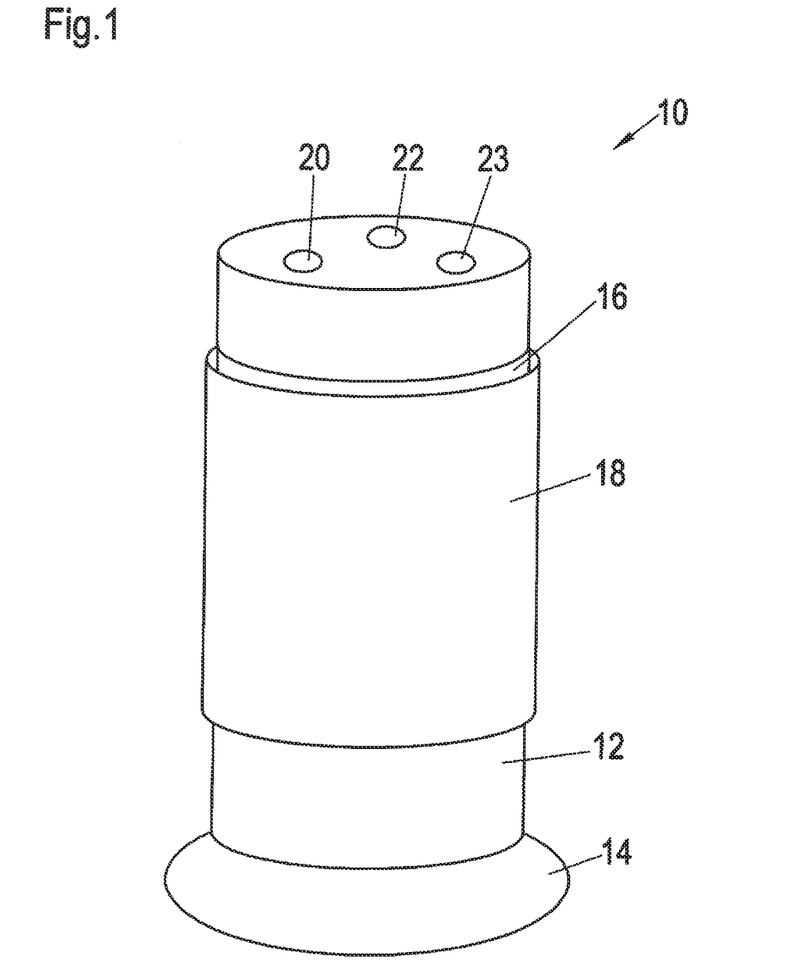
FIG. 1 a sequence generation unit of a first embodiment of a system in accordance with the invention.
Figure 2:
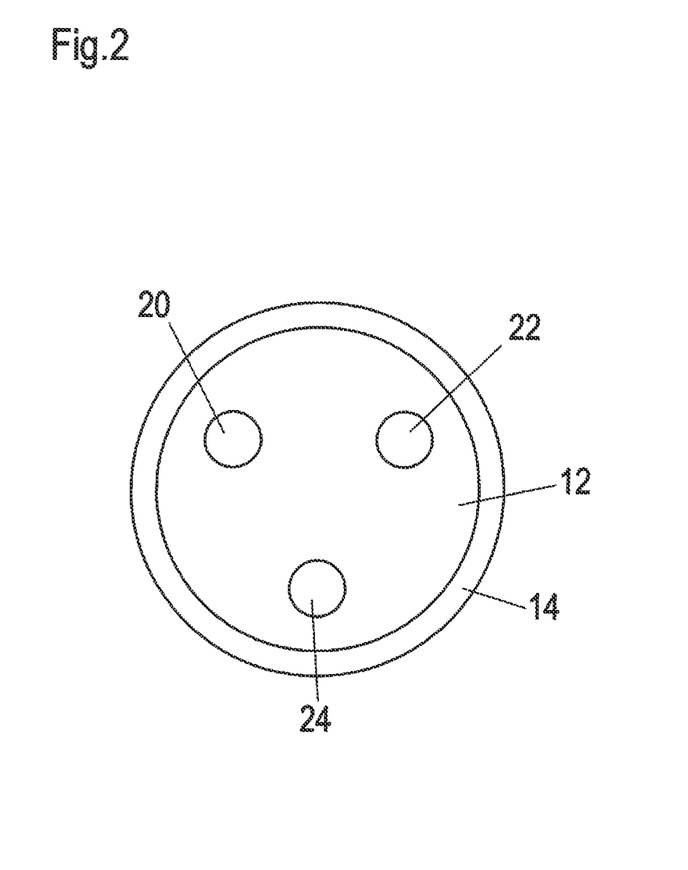
FIG. 2 a plan view of the upper side of the sequence generation unit of FIG. 1.

FIGS. 1 and 2 show a sequence generation unit 10 in a perspective view and in a plan view. A cylindrical base body 12 can be seen having a stand 14 which serves for a secure footing.

A reflective surface 16 is provided at the cylindrical body 12, e.g. an adhered reflector film which is here covered by the liquid crystal diaphragm 18 still to be described. Three selection buttons 20, 22 and 24 can be recognized at the upper end surface of the cylindrical base body 12.

Reference symbol 18 designates a liquid crystal diaphragm, which can be switched to opaque or transparent as a whole or in regions in a manner known per se like a liquid crystal display. For this purpose, voltage is applied in a suitable manner to the liquid crystal diaphragm in a similar manner as to a liquid crystal display.

The selection buttons 20, 22 and 24 serve for the selection of sequence which can be set at the liquid crystal diaphragm 18. In this respect, a different code sequence is set at the liquid crystal diaphragm 18 depending on the selection via the buttons 20, 22, 24 so that a different sequence of opaque and transparent time periods is generated by the liquid crystal diaphragm 18 in dependence on the selected sequence. The sequence generation unit has for this purpose a corresponding control device for the liquid crystal diaphragm 18.

Depending on which selection button 20, 22, 24 is pressed, the reflector film 16 therefore becomes visible from the outside in a different time sequence.

The number of buttons can differ depending on how many different optical sequences can be showable by the sequence generation unit. Any other conceivable selection possibility is likewise possible, for example a rotary knob, a radio link or a Bluetooth link.

Figure 3:
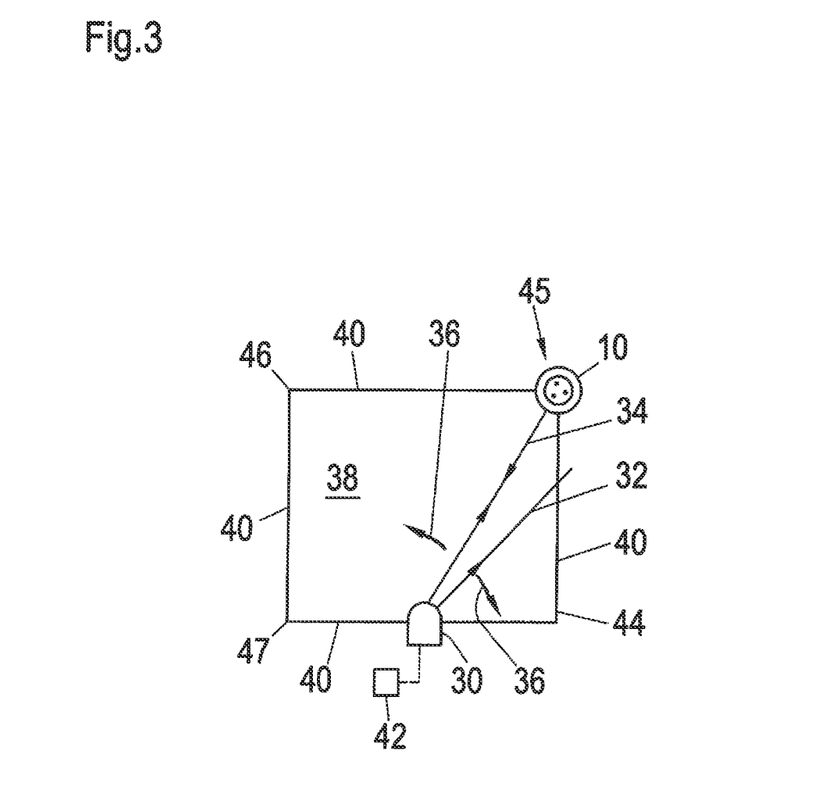
FIG. 3 an example of a monitored zone to be configured using a system in accordance with the invention.

FIG. 3 shows a possible use of such a sequence generation unit. A laser scanner system 30 is shown schematically here. The laser beam 32, 34 is periodically pivoted to and fro in the deflection direction, with this e.g. taking place using a deflection mirror rotating in a manner known per se within the laser scanner 30. If the laser beam 32, 34 impacts an obstacle, it is reflected and is detected by a receiver present in a manner known per se in the laser scanner 30 so that the angular position of a reflective or remitting object can be registered. The evaluation unit 42 can additionally determine the distance of a reflective object from the time of flight of a light pulse transmitted by the laser scanner 30 and reflected back from the object. The corresponding information can be evaluated using an evaluation unit 42 only shown schematically here to obtain information on objects and their position in the monitored zone.

A desired monitored zone which is to be bounded by boundary lines 40 is shown by 38 in FIG. 3. To fix this monitored zone, the sequence generation unit 10 is positioned consecutively at the corners 44, 45, 46 and 47 of the monitored zone 38 which is desired to be rectangular here. The point in time is shown in FIG. 3 in which the sequence generation unit 10 is positioned at the corner 45. The possible optical sequences of such a sequence generation unit can e.g. be as follows: Selection with the button 20: "Start of a polygonal chain"; Selection button 22: "Corner point of a polygonal chain"; Selection button 24: "End of a polygonal chain". Other buttons can be provided for different shape elements. The number of the selection buttons 20, 22, 24 is in this respect determined from the number of possible shape elements which are to be represented by the sequence generation unit 10 via different optical sequences.

The method in accordance with the invention can be carried out as following using such a system in accordance with the invention:

The scanner 30 is taken into operation so that the laser beam 32 periodically moves in the direction of the arrows 36.

The sequence generation unit 10 is first positioned at the corner 44 of the desired monitored zone 38.

By selection with the button 20 (Start of the polygon chain), a corresponding optical sequence is set with the aid of the liquid crystal diaphragm 18 which is time variable in a characteristic manner, e.g. at a first frequency. The sequence generation unit then automatically generates this sequence. The laser beam, which moves in direction 36 over the scan field, will be incident at the sequence generation unit 10 at the point 44 and is reflected in accordance with the time variation of the remission change caused by the liquid crystal diaphragm 18 with a corresponding time variation. The laser scanner 30 and its evaluation unit 42 register the corresponding time variation of the optical sequence and can draw a conclusion from the detected optical sequence via an association stored in a memory device of the evaluation unit 42 on a shape element which fits this optical sequence; in the present case therefore the shape element "Start of the polygonal chain".

In the evaluation unit 42 of the laser scanner 30, a corresponding evaluation algorithm continuously checks whether a remission change is recognized in the scan field of the laser scanner 30 which corresponds to the optical sequence of a corresponding shape element. Provision can also be made that a corresponding teaching mode has to be switched to active.

Next, the sequence generation unit 10 is positioned at a corner point 45 of the polygonal desired monitored one 38. By a selection e.g. with the selection button 22, an optical sequence is selected for representation with the sequence generation unit 10 which corresponds to the shape element "Corner point of the polygonal chain". If the laser beam 32, 34 is incident onto the sequence generation unit 10 at this point, the laser beam registers the optical sequence generated by the sequence generation unit which is specific to this selected shape element. The evaluation unit 42 of the laser scanner 30 can in turn, with the aid of the association stored in the memory device of the evaluation unit 42, associate and store the corresponding shape element "Corner of the polygonal chain".

Next, the sequence generation unit 10 is positioned at another corner point 46 of the polygonal chain and the shape element "Corner point of the polygonal chain" is again selected with the help of the selection button 22. The sequence generation unit 10 with the aid of the liquid crystal diaphragm 18 generates the corresponding optical sequence which is detected by the laser beam 32, 34 of the laser scanner 30. In turn, the evaluation unit 42 can draw a conclusion on the selected shape element from the optical sequence via the associated stored in its memory unit.

Finally, the sequence generation unit 10 is positioned at the corner point 47 of the polygonal chain and the shape element "End point of the polygonal chain" is selected with the aid of the selection button 24. If the laser beam 32, 34 is incident at the sequence generation unit at this point, the laser scanner 30 can detect the corresponding optical sequence generated by the sequence generation unit and the evaluation unit 42 can draw a conclusion on the corresponding shape element from the optical sequence via the associated stored in its memory device.

A state is shown by way of example in FIG. 3 in which the sequence generation unit 10 is positioned at the corner point 45 so that here the laser beam 34 which is just incident onto the sequence generation unit 10 is reflected with the time variation of the selected optical sequence.

In a manner known per se, the respective position of the sequence generation unit 10 is known to the laser scanner 30 via its normal spatially resolving function.

The evaluation unit can draw a conclusion from the stored shape elements, whose position is known via the laser scanner system, on the shape of the monitored zone defined in this manner and can configure the laser scanner 30 accordingly. The monitored zone 38 of the laser scanner 30 is thus configured as set.

Figure 4:
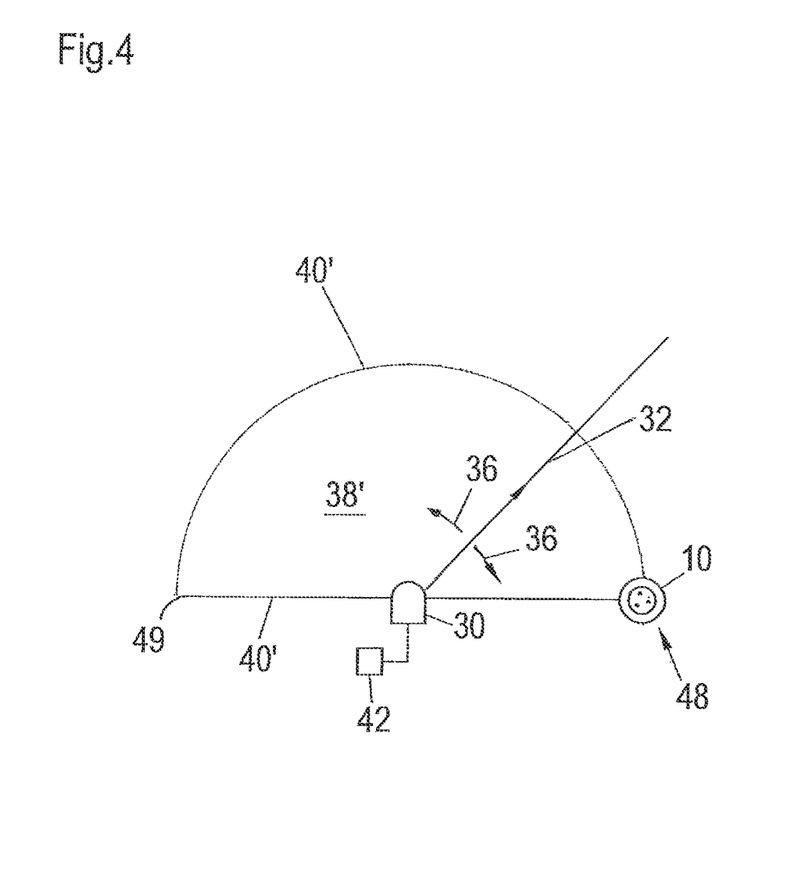
FIG. 4 a further example of a monitored zone configurable with a system in accordance with the invention.

FIG. 4 shows an alternative application. A semicircular monitored zone 38' should be set here and should be used for configuring the laser scanner 30. For this purpose, the sequence generation unit 10 is first positioned at the corner point 48. The shape element "Start of a semicircle" is selected via a corresponding selection button and a correspondingly associated optical sequence is generated by the sequence generation unit 10. For this purpose, as already described with reference to FIGS. 1 to 3, a liquid crystal diaphragm 18 is made transparent or opaque using a time coding associated with this shape element.

Once the laser beam 32 of the laser scanner 30 has registered the position of the sequence generation unit 10 with the corresponding optical sequence, the sequence generation unit 10 is positioned at the end point 49 of the semicircle and the shape element "End of a semicircle" is selected using a corresponding selection button. The laser beam 32 of the laser scanner 30 registers the optical sequence at the corresponding location of the sequence generation unit 10 and can—as described with reference to FIGS. 1 to 3—determine and register the corresponding shape element from the optical sequence.

The evaluation unit 42 of the laser scanner 30 can thus fix the monitored zone 38' using the information on the position of the starting point and the end point of the semicircle, which is intended to bound the monitored zone 38', and can configure the laser scanner 30 with this information. The limits of the desired protected zone are indicated by 40' in FIG. 4.

With corresponding arrangements, it can also be sufficient to position the sequence generation unit 10 at a point of a (part) circle in order solely to use the radius as a corresponding shape element.

Figure 5:
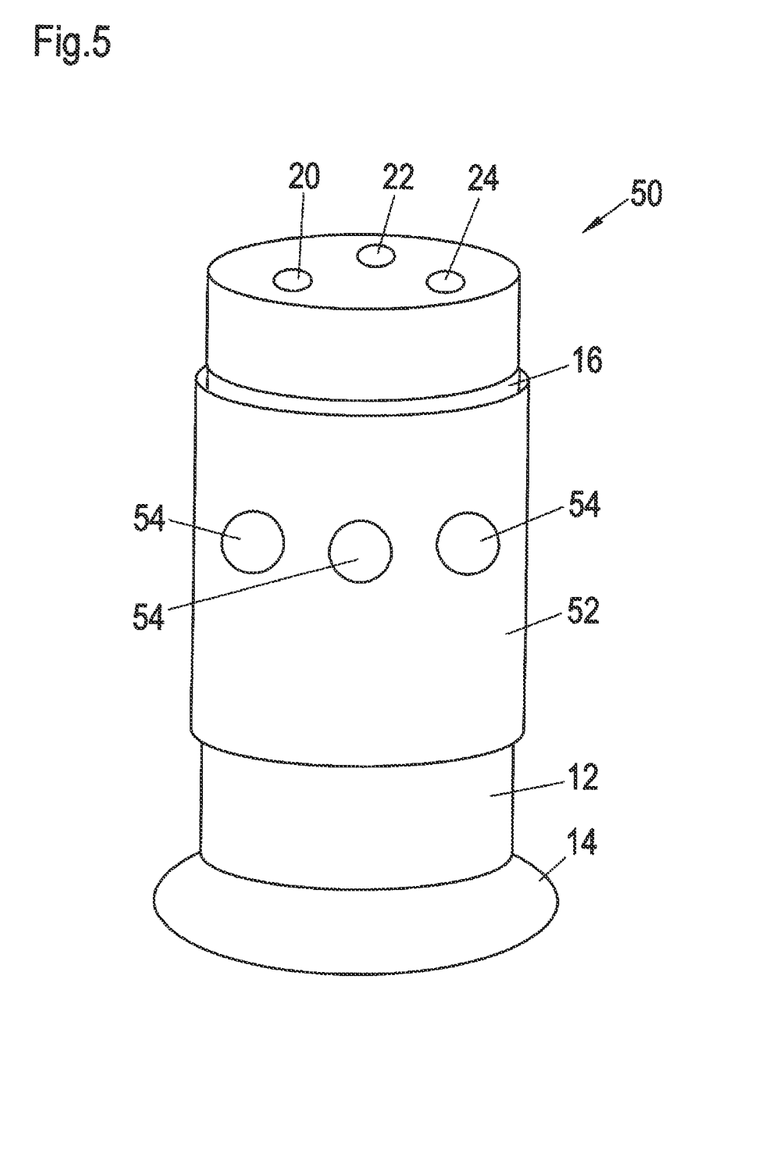
FIG. 5 a sequence generation unit of a second embodiment of a system in accordance with the invention.

FIG. 5 shows an alternative embodiment 50 of the sequence generation unit 50. Instead of the liquid crystal diaphragm 18, a diaphragm body 52 is provided here which has electromagnetic diaphragms 54. Depending on which optical sequence is to be represented, these diaphragms 54 are opened and closed in a predefined time sequence by the sequence generation unit with the aid of a corresponding automatic mechanism so that the reflective surface 16 with a time pattern becomes visible.

This time pattern is recognized with the aid of the laser beam 32, 34 of the laser scanner 30.

Figure 6:
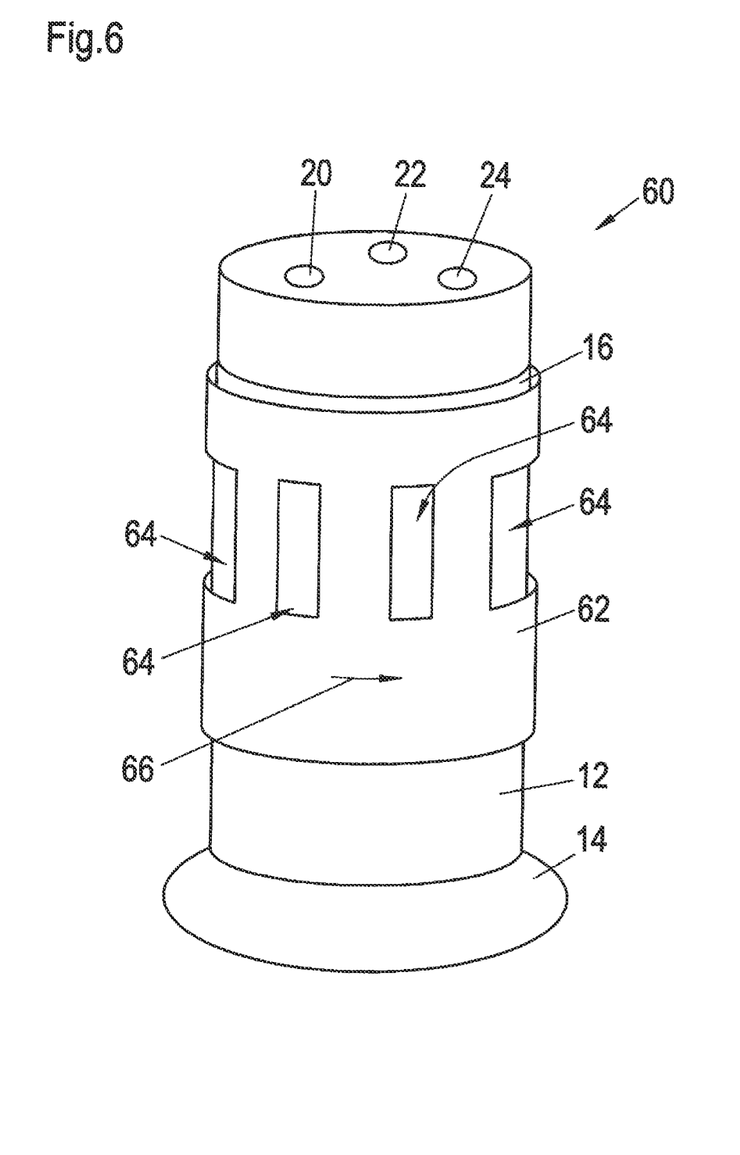
FIG. 6 a sequence generation unit of a third embodiment of a system in accordance with the invention.

FIG. 6 shows a further embodiment in which a diaphragm body 62 rotates in the direction 66. Apertures 64 make it possible that laser beams of the laser scanner 30 are incident from the outside onto the sequence generation unit 60 shown here onto the reflective surface 16 and are reflected there. Depending on the speed of the movement of the diaphragm body 62 in the rotational direction 66, a different modulation frequency of the reflected light therefore arises. This can be detected by the laser scanner 30. Depending on which selection button 20, 22, 24 is pressed, the diaphragm body 62 is rotated at different speeds with the aid of a corresponding drive of the sequence generation unit so that different frequencies can be generated which can be associated with individual shape elements which can be selected with the aid of the selection buttons.

Alternatively, instead of the diaphragm body 62, a carrier body having a reflective part zone and e.g. configured as a rotating cylinder can be provided.

Figure 7:
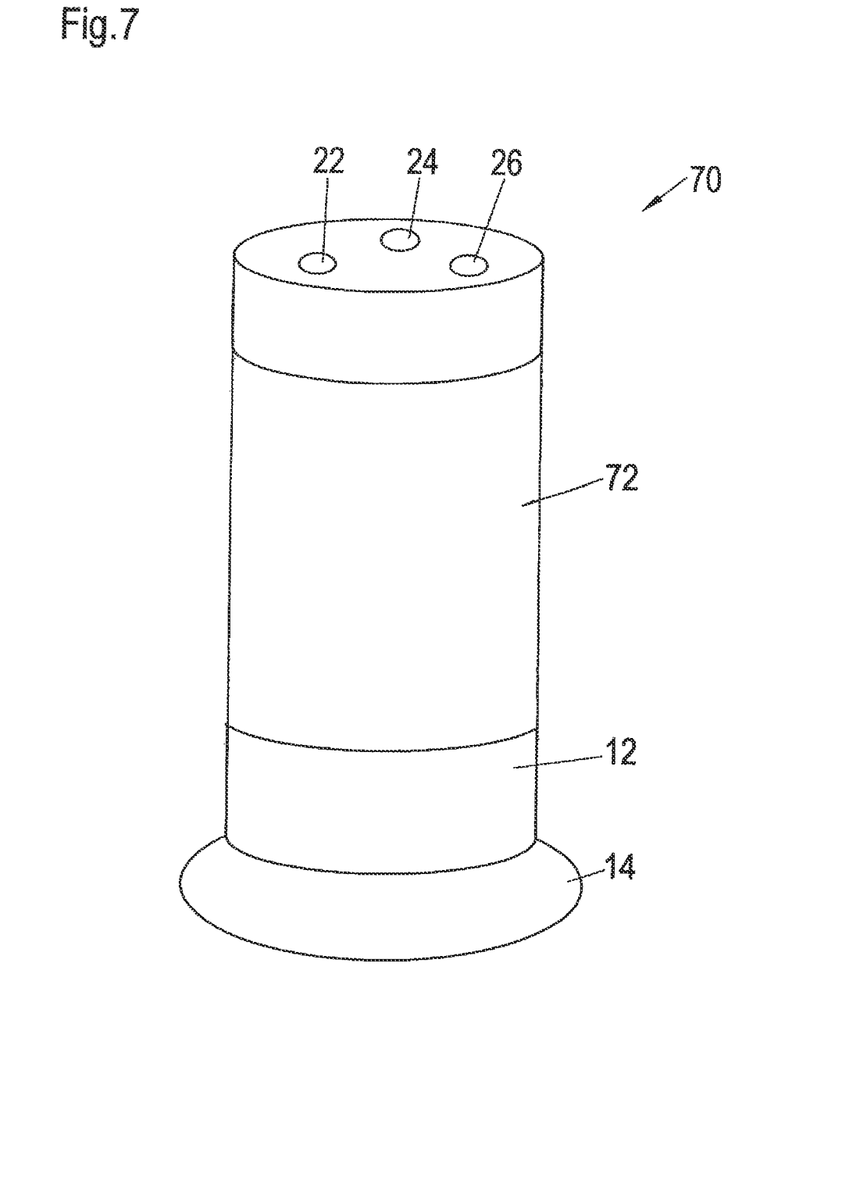
FIG. 7 a sequence generation unit of a fourth embodiment of a system in accordance with the invention.

FIG. 7 shows a sequence generation unit 70 with an active illumination 72. Depending on the selection with the selection buttons 22, 24, 26, light is transmitted at a different modulation frequency and the light can be detected by the optical reception device of the laser scanner 30. The position of the sequence generation unit 70 is determined in the described manner with the aid of the normal laser scanner function so that an association of the transmitted optical sequence with the position of the sequence generation unit 70 is possible.

Alternatively, a continuous light source can also be used whose transmission is time-varied by diaphragms—as described above for the remission variation.

The method for fixing the monitored zone in which sequence generation units 50, 60, 70 are used such as are shown in FIGS. 5, 6 and 7 corresponds in an analog manner to the method which is explained with reference to FIGS. 1 to 4.

It is possible simply and fast with the method and systems in accordance with the invention to determine, to fix or to vary the geometry of a monitored zone. The method is above all suitable for such users where no trained personnel is available on site who would be able to fix a monitored zone using complicated configuration software. It is e.g. also possible with the invention to take a system into operation in production with default monitored zones and to carry out the final dimensioning of the monitored zone directly on site and matched to the respective requirements.

The invention claimed is:

1. A system for configuring a monitored zone (38, 38') of an optoelectronic monitoring device (30) comprising:
    a sequence generation unit (10, 50, 60, 70) for generating time-variable distinguishable optical sequences, the sequence generation unit having one or more selection devices (20, 22, 24) for selecting an optical sequence from the sequence generation unit (10, 50, 60, 70), wherein the sequence generation unit (10, 50, 60, 70) is positioned at one or more selected locations of the monitored zone (38, 38') to be defined, wherein the one or more selection devices (20, 22, 24) correspond to one or more optical sequences selectable at the one more selected locations of the monitored zone (38, 38'); and
    an optoelectronic monitoring device (30) for the spatially resolved monitoring of the monitored zone (38, 38'), wherein the monitoring device (30) is a laser scanner and comprises:
        an optical receiver for detecting the optical sequences generated by the sequence generation unit (10, 50, 60, 70);
        a first memory device for storing an association between (i) the optical sequences selectable via the one or more selection devices (20, 22, 24) of the sequence generation unit, and (ii) shape elements which can serve for the characterization of the shape of the monitored zone (38, 38') to be configured;
        a second memory device for storing a shape of the monitored zone (38, 38'); and
        an evaluation device (42) for determining the shape of the monitored zone (38, 38') from the detected optical sequences and the association stored in the first memory device, and for storing the shape of the monitored zone (38, 38') in the second memory device.

2. The system for configuring the monitored zone of the optoelectronic monitoring device in accordance with claim 1, wherein the monitored zone is a monitored zone of the scanner.

3. The system for configuring the monitored zone of the optoelectronic monitoring device in accordance with claim 1, wherein the shape elements characterizing the shape of the monitored zone (38, 38') to be configured comprise starting points and end points (48, 49) of a predefined line.

4. The system for configuring the monitored zone of the optoelectronic monitoring device in accordance with claim 3, wherein the predefined line is a line of a part circle.

5. The system for configuring the monitored zone of the optoelectronic monitoring device in accordance with one of the claim 1, wherein the shape elements characterizing the shape of the monitored zone to be configured comprise a radius of a circle or the part circle.

6. The system for configuring the monitored zone of the optoelectronic monitoring device in accordance with claim 1, wherein form elements characterizing the shape of the monitored zone to be configured comprise corner points (44, 45, 46, 47) of a polygonal chain.

7. The system for configuring the monitored zone of the optoelectronic monitoring device in accordance with claim 1, wherein the sequence generation unit comprises a unit (10, 50, 60) for varying the remission of at least one region of the sequence generation unit.

8. The system for configuring the monitored zone of the optoelectronic monitoring device in accordance with claim 7, wherein the sequence generation unit comprises a reflective surface (16) and one of an electromagnetic diaphragm (52, 54) and a liquid crystal diaphragm (18) for the time-variable shading of the reflective surface (16) for varying the remission.

9. The system for configuring the monitored zone of the optoelectronic monitoring device in accordance with claim 7, wherein the sequence generation unit comprises a movable diaphragm device (62) which has one or more apertures (64) and which is moved past a reflective surface (16) to generate a time-variable optical sequence.

10. The system for configuring the monitored zone of the optoelectronic monitoring device in accordance with claim 9, wherein the movable diaphragm device (62) is a rotatable diaphragm device.

11. The system for configuring the monitored zone of the optoelectronic monitoring device in accordance with claim 1, wherein the sequence generation unit (70) comprises a light source (72) for generating different light signals.

12. The system for configuring the monitored zone of the optoelectronic monitoring device in accordance with claim 11, wherein the different light signals are modulated light signals with a different modulation frequency.

13. A system for generating time-variable distinguishable optical sequences comprising:
    a sequence generation unit (10, 50, 60, 70), the sequence generation unit having one or more selection devices (20, 22, 24) for selecting an optical sequence, wherein the one or more selection devices (20, 22, 24) correspond to one or more optical sequences selectable at one more selected locations of a monitored zone; and
    an optoelectronic monitoring device (30), wherein the monitoring device (30) comprises:
    an optical receiver for detecting the optical sequences generated by the sequence generation unit (10, 50, 60, 70);
    a first memory device for storing an association between (i) the optical sequence selectable via the one or more selection devices (20, 22, 24) of the sequence generation unit, and (ii) shape elements which can serve for the characterization of the shape of the monitored zone (38, 38') to be configured;
    a second memory device for storing a shape of the monitored zone; and
    an evaluation device (42) for determining the shape of the monitored zone from the detected optical sequences and the association stored in the first memory device, and for storing the shape of the monitored zone in the second memory device.

14. A configuration method for fixing a monitored zone, wherein a sequence generation unit (10, 50, 60, 70) of a system is positioned at one or more selected locations (44, 45, 46, 47, 48, 49) of the monitored zone (38, 38') to be determined;

the system comprising:
- the sequence generation unit (10, 50, 60, 70) having one or more selection devices (20, 22, 24); and
- an optoelectronic monitoring device (30), wherein the monitoring device (30) has the following:
- an optical receiver;
- a first memory device;
- a second memory device; and
- an evaluation device (42);

an optical sequence is selected using the one or more selection devices (20, 22, 24) of the sequence generation unit (10, 50, 60, 70), wherein the one or more selection devices (20, 22, 24) correspond to one or more optical sequences selectable at one more selected locations of a monitored zone, wherein the optical sequence corresponds to a shape element which characterizes the shape of the monitored zone (38, 38') to be determined at the selected location (44, 45, 46, 47, 48, 49) with the following steps;

generating selected optical sequence;

detecting the generated optical sequence at the selected location (44, 45, 46, 47, 48, 49) using the monitoring device (30) of the system; and determining the shape element associated with the detected optical sequence in accordance with the association stored in the first memory device;

wherein, the previous steps are repeated until the shape of the monitored zone (38, 38') to be determined is generated; and storing the shape of the monitored zone (38, 38') determined by the shape elements.

15. The configuration method in accordance with claim 14, wherein the monitored zone is a monitored zone of a scanner.

\* \* \* \* \*